United States Patent
Stocker

(10) Patent No.: US 6,881,697 B1
(45) Date of Patent: Apr. 19, 2005

(54) PROCESS FOR PRODUCING TITANIUM-CONTAINING SILICON OXIDE CATALYST, THE CATALYST, AND PROCESS FOR PRODUCING OXIRANE COMPOUND WITH THE CATALYST

(75) Inventor: Carsten Stocker, Meerbusch (DE)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/129,533

(22) PCT Filed: Nov. 2, 2000

(86) PCT No.: PCT/JP00/07767

§ 371 (c)(1),
(2), (4) Date: May 7, 2002

(87) PCT Pub. No.: WO01/34299

PCT Pub. Date: May 17, 2001

(30) Foreign Application Priority Data

Nov. 9, 1999 (JP) .......................... 11-318112

(51) Int. Cl.$^7$ ............................... B01J 31/00
(52) U.S. Cl. ................ 502/150; 524/492; 524/588; 502/102; 502/103
(58) Field of Search ................ 524/492, 588; 502/150, 103, 104, 232, 233, 236, 237, 239; 501/12

(56) References Cited

U.S. PATENT DOCUMENTS

| | | | |
|---|---|---|---|
| 4,367,342 A | | 1/1983 | Wulff et al. |
| 4,717,708 A | | 1/1988 | Cheng et al. |
| 5,081,267 A | | 1/1992 | Rameswaran et al. |
| 5,262,550 A | * | 11/1993 | Crocco et al. ............. 549/531 |
| 5,578,217 A | * | 11/1996 | Unger et al. ............... 210/670 |
| 5,674,642 A | * | 10/1997 | Le et al. .................... 429/231.2 |
| 5,935,895 A | | 8/1999 | Baiker et al. |
| 6,013,391 A | * | 1/2000 | Le et al. .................... 429/231.2 |
| 6,096,910 A | | 8/2000 | Yamamoto et al. |
| 6,160,137 A | | 12/2000 | Tsuji et al. |
| 6,251,851 B1 | * | 6/2001 | D'Amore et al. .......... 502/158 |
| 6,413,903 B1 | * | 7/2002 | Kourtakis .................. 502/209 |
| 6,423,770 B1 | * | 7/2002 | Katz ........................... 524/492 |
| 6,624,236 B1 | * | 9/2003 | Bissinger et al. .......... 524/588 |

FOREIGN PATENT DOCUMENTS

| | | |
|---|---|---|
| EP | 1216998 A1 | 6/2002 |
| EP | 1243585 A1 | 9/2002 |
| JP | 10-291986 A | 11/1998 |
| NL | 1012748 C | 6/2000 |
| WO | WO 9609117 A1 | 3/1996 |

OTHER PUBLICATIONS

K. J. Shea et al., "Arylsilsesquioxane Gels and Related Materials. New Hybrids of Organic and Inorganic Networks", J. Am. Chem. Soc., 114, (1992), pp. 6700–6710 with Abstract.

D. A. Loy et al. "Sol–Gel Synthesis of Hybrid Organic–Inorganic Materials. Hexylene– and Phenylene–Bridged Polysiloxanes", 8, (1996) pp. 656–663.

D. A. Loy et al., "Bridged Polysilsesquioxanes. Highly Porous Hybrid Organic–Inorganic Materials", Chem. Rev., 95, (1995) pp. 1431–1442.

* cited by examiner

Primary Examiner—David Sample
Assistant Examiner—Jennine Brown
(74) Attorney, Agent, or Firm—Sughrue Mion, PLLC

(57) ABSTRACT

A process for producing a titanium-containing silicon oxide catalyst having a silicon-carbon-silicon bond, silicon-oxygen-silicon bond and silicon-oxygen-titanium bond which includes causing a silicon compound of the following formula (1) and a titanium alkoxide compound to gel in a water and/or alcohol solvent and removing the solvent in the resulted gel by extraction with a supercritical fluid

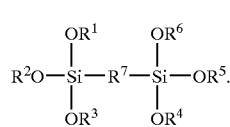

(1)

($R^1$ to $R^7$ each independently represent a hydrocarbon group having 1 to 20 carbon atoms.).

5 Claims, No Drawings

PROCESS FOR PRODUCING TITANIUM-CONTAINING SILICON OXIDE CATALYST, THE CATALYST, AND PROCESS FOR PRODUCING OXIRANE COMPOUND WITH THE CATALYST

TECHNICAL FIELD

The present invention relates to a process for producing a titanium-containing silicon oxide catalyst, said catalyst and a process for producing an oxirane compound using the catalyst. More particularly, the present invention relates to a process for producing a titanium-containing silicon oxide catalyst by which an oxirane compound can be obtained under high selectivity and yield by reacting an olefin and a hydroperoxide compound in the presence of said catalyst, said catalyst and a process for producing an oxirane compound using the catalyst.

BACKGROUND ART

Methods of obtaining an oxirane compound by reacting an olefin and a hydroperoxide compound in the presence of a catalyst are publicly known. For example, U.S. Pat. No. 4,367,342 discloses a process for using a titanium-supported silica catalyst. However, conventional methods are insufficient from the standpoints of selectivity to a oxirane compound as an objective compound and yield thereof.

DISCLOSURE OF THE INVENTION

An object of the present invention is to provide a process for producing a titanium-containing silicon oxide catalyst by which an oxirane compound can be obtained with high selectivity and yield by reacting an olefin and a hydroperoxide compound in the presence of said catalyst, said catalyst and a process for producing an oxirane compound using the catalyst.

Namely, the present invention relates to a process for producing a titanium-containing silicon oxide catalyst having a silicon-carbon-silicon bond, silicon-oxygen-silicon bond and silicon-oxygen-titanium bond, which comprises causing a silicon compound of the following formula (1) and a titanium alkoxide compound to a gel in a water and/or alcohol solvent and removing the solvent in the resulted gel by extraction with a supercritical fluid:

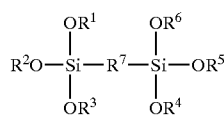
(1)

(wherein, $R^1$ to $R^7$ each independently represent a hydrocarbon group having 1 to 20 carbon atoms.).

Further, another invention relates to a process for producing an oxirane compound, comprising reacting an olefin with a hydroperoxide compound in the presence of a catalyst obtained by the above-mentioned process.

BEST MODE FOR CARRYING OUT THE INVENTION

In the process for producing a titanium-containing silicon oxide catalyst of the present invention, silicon compounds of the following formula (1) (hereinafter, referred to as silicon compound (1)) are used:

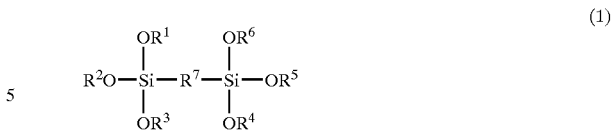
(1)

(wherein, $R^1$ to $R^7$ each independently represent a hydrocarbon group having 1 to 20 carbon atoms.).

Preferably, $R^1$ to $R^6$ represent an alkyl group, and a methyl group, ethyl group, propyl group, butyl group, isopropyl group, isobutyl group and the like are exemplified, and particularly preferable are a methyl group and an ethyl group which are easily available industrially.

$R^7$ represents a divalent hydrocarbon group having 1 to 20 carbon atoms, and examples thereof include alkylene groups such as a methylene group, ethylene group, propylene group, butylenes group and the like, aromatic hydrocarbon groups such as a phenylene group, 1,4-bis(methylene) phenylene group, 1,4-bis(ethylene)phenylene group and the like, further, hydrocarbon groups obtained by combining them, and parts of these hydrocarbon groups may be substituted with hetero atoms.

Preferable specific examples of the silicon compound (1) include bis(triethoxysilyl)ethane, bis(triethoxysilyl) methane, bis(trimethoxysilyl)ethane, bis(trimethoxysilyl) methane, bis(trimethoxysilyl)hexane, 1,4-bis (trimethoxysilylethyl)benzene and the like.

In the present invention, it is preferable to use a silicon compound of the following formula (2) (hereinafter, referred to as silicon compound (2)) and/or a silicon compound of the following formula (3) (hereinafter, referred to as silicon compound (3)) in addition to the silicon compound (1) from the standpoint of controllability of skeleton strength and hydrophobicity to any degrees.

$$Si(OR^8)_4 \qquad (2)$$

$$(R^9)_m Si(OR^{10})_{4-m} \qquad (3)$$

($R^8$, $R^9$ and $R^{10}$ each independently represents a hydrocarbon group having 1 to 20 carbon atoms. m represents an integer of 1 or 2. When a plurality of $R^8$'s, $R^9$'s or $R^{10}$'s are present, they may be the same or different.).

Preferably, examples of the hydrocarbon group include alkyl groups having 1 to 20 carbon atoms such as a methyl group, ethyl group, propyl group, isopropyl group, butyl group and the like, aryl groups having up to 20 carbon atoms such as a phenyl group and the like, aralkyl groups having up to 20 carbon atoms such as a benzyl group an the like, and parts of these hydrocarbon groups may be substituted by hetero atoms. Particularly preferable are a methyl group, ethyl group, propyl group, butyl group and phenyl group which are easily available industrially.

Preferable specific examples of the silicon compound (2) include tetramethoxysilane, tetraethoxysilane, tetrapropoxysilane, tetraisopropoxysilane, tetrabutoxysilane and the like. Preferable specific examples of the silicon compound (3) include trimethoxymethylsilane, trimethoxyphenylsilane, dimethoxydimethylsilane, triethoxymethylsilane, triethoxyphenylsilane and the like.

The ratio of the molar amount of hydrocarbon groups bonded to a silicon atom to the total silicon molar amount of the silicon compound (1), and silicon compound (2) and/or silicon compound (3) is preferably from 5 to 150%, further preferably from 2.0 to 80%. When the ratio is too small, the catalytic performance may be decreased, on the other hand, when too large, gellation may not progress in catalyst synthesis.

As the titanium alkoxide compound, tetramethoxytitanium, tetraethoxytitanium, tetrapropoxytitanium, tetraisopropoxytltanium, tetrabutoxytitanium, diisopropoxybisacetylacetonatotitanium and the like are exemplified.

The use amount used (molar amount) of the titanium alkoxide compound is preferably from 0.0001 to 1 based on the total molar amounts of all silicon compounds. When the use amount of the titanium alkoxide compound is too small, the activity may become low because of decrease of active points, on the other hand, when too large, the activity may become low because of production of titania.

As the solvent alcohol, methanol, ethanol, n-propanol, isopropanol, butanol, cyclohexanol, ethylene glycol and the like are exemplified.

In the present invention, a silicon compound and a titanium alkoxide compound are gelled in a water and/or alcohol solvent. As the gelling method, the following methods are mentioned. Namely, hydrolysis and condensation reaction of a silicon compound and titanium compound are progressed by adding usually an acid or alkaline as a promoter into an aqueous and/or an alcoholic solution containing a silicon compound and titanium compound dissolved, to obtain gel which is a polymeric condensate having a silicon-carbon-silicon bond, silicon-oxygen-silicon bond and silicon-oxygen-titanium bond. The gelling reaction is usually conducted at from −30 to 100° C. Aging may also be conducted for growth of gelled solid. Aging is usually conducted at from 0 to 200° C. for 180 hours or less. As the above-mentioned promoter for hydrolysis and condensation reaction, an acid or an alkaline is used, and use of an acid is preferable from the standpoint of the resulting catalytic performance. Examples of the acid include inorganic acids such as nitric acid, hydrochloric acid, sulfuric acid and the like and organic acids such as formic acid, acetic acid and the like, and examples of the alkaline include sodium hydroxide, potassium hydroxide, ammonia and the like. The added amount of the acid or alkaline can not be restricted since it depends on the kinds and gelling conditions of raw material compounds, and usually in the range from 0.0001 to 100 mol permol of the silicon compound.

A solvent in the resulted gel is removed by extraction with supercritical fluid. As the fluid, carbon dioxide, methanol, ethanol, propanol and the like are exemplified, and use of carbon dioxide is preferable since post treatment is easy and a high catalytic performance is obtained. As the method of extraction, the following are mentioned. That is, the supercritical extraction can be carried out under conditions for forming supercritical carbon dioxide in an autoclave charged with gel, namely, by flowing supercritical carbon dioxide at a temperature of about 31° C. or more under a pressure of about 7.3 MPa or more. For example, supercritical carbon dioxide fluid having a temperature of 31 to 100° C. and a pressure of 10 to 30 MPa can be used. By this procedure, water and/or an alcohol solvent incorporated in gel can be removed by extraction. In extraction removal, it is necessary to use supercritical fluid. By this process, porosity which is preferable for a catalyst can be obtained.

In the present invention, after the supercritical extraction operation, the product can be dried and further subjected to silylation treatment. The drying can be carried out at from 0 to 200° C. under reduced pressure or under a stream of air, nitrogen or the like. The silylation treatment is conducted by contacting a dried catalyst obtained in the former step with a silylating agent in a solvent or gas phase at a temperature from 20 to 300° C. to convert a hydroxyl group present on the surface of a catalyst into a silyl group. By performing this silylation treatment, a catalytic performance can be improved. Examples of the silylating agent include organosilanes such as chlorotrimethylsilane, dichlorodimethylsllane, chlorotriethylsilane and the like, organosilylamines such as N-trimethylsilylimidazole, N-t-butyldimethylsllylimidazole, N-trimethylsilyldimethylamine and the like, organosilylamides such as N,O-bistrimethylsilylacetamide, N-trimethylsilylacetamide and the like, organosilazanes such as hexamethyldisilazane, heptamethyldisilazane and the like. Hexamethyldisilazane is a preferable silylating agent.

The catalyst of the present invention is a titanium-containing silicon oxide catalyst having a silicon-carbon-silicon bond, silicon-oxygen-silicon bond and silicon-oxygen-titanium bond. The silicon-carbon-silicon bond in the catalyst can be confirmed mainly by $^{29}$Si-NMR and $^{13}$C-NMR. For example, when two Si atoms are crosslinked through a phenyl group, carbon number of a phenyl group bonded to Si can be confirmed by two peaks near 145 ppm by $^{13}$C-NMR, and presences of Si and Si atom bonded to C can be confirmed by three peaks appearing near −60 ppm to −80 ppm by $^{29}$Si-NMR. Details thereof are described in a literature of Douglas A. Loy, Kenneth J. Shea, et al. (J. Am. Chem. Soc. 1992, 114, 6700, J. of Non-Crystalline Solids 1993, 160, 234) and the like. Further, the state of titanium present in the catalyst can be confirmed by a UV spectrometer or the like. Existence of an absorption band near 200 to 230 nm indicates a titanium atom present in highly dispersed condition in silica. On the other hand, when titanium compounds are mutually condensed to give poorly dispersed state, an absorption band appears characteristically in a region of 300 nm or more.

The catalyst obtained in the present invention can be used in selective oxidation reactions, for example, an olefin epoxidation reaction, and additionally, various oxidation reactions of organic compounds, since the catalyst has large surface area and highly dispersed titanium active sites. If desired, it is also possible to reinforce acid sites of the catalyst by addition of a third component such as alumina or the like, and the catalyst can be used also in an alkylation reaction, catalytic reforming reaction and the like.

The catalyst of the present invention is optimally used in a process for producing an oxirane compound, comprising reacting an olefin and a hydroperoxide compound.

As the olefin subjected to the reaction, exemplified are ethylene, propylene, 1-butene, 2-butene, isobutylene, butadiene, 1-pentene, isoprene, 1-hexene, 1-octene, 1-decene, cyclopentene, cyclohexene, styrene, allyl chloride, allyl alcohol and the like.

As the hydroperoxide compound subjected to the reaction, any of organic hydroperoxides and inorganic hydroperoxides can be used. As the organic hydroperoxide, ethylbenzene hydroperoxide, cumene hydroperoxide, t-butyl hydroperoxide and the like are exemplified. As the inorganic hydroperoxide, hydrogen peroxide and the like are exemplified.

From the industrial viewpoint, a process for producing propylene oxide from propylene and organic hydroperoxide is important, and the catalyst of the present invention can be used suitably in this reaction.

The reaction is carried out in liquid phase in the presence or absence of a suitable solvent. As the solvent, compounds which are inert to the reaction and abundant in solubility of an olefin and/or hydroperoxide compound can be used. Specific examples of a solvent when an organic hydroperoxide is used include hydrocarbons such as butane, octane, benzene, toluene, ethylbenzene, cumene and the like. On the other hand, specific examples of a solvent when an inorganic hydroperoxide is used include methanol, ethanol, isopropanol, t-butanol, water and the like.

The epoxidation reaction can be conducted generally at temperatures from 0 to 200° C. The pressure may be such extent as to keep a reaction mixture in liquid condition, and generally from 0.1 to 10 MPa. The epoxidation reaction uses a powder catalyst or molded catalyst and can be carried out in a slurry or fixed bed according to a batch-wise method, semi-continuous method or continuous method.

EXAMPLES

Next, the present invention are illustrated by Examples.

Example 1

Into a 300 ml flask was charged 32.1 g of 1,4-bis(trimethoxysilylethyl)benzene, 2.31 g of tetra-n-butoxytitanium and 65 ml of n-propanol. A mixed solution of 23 ml of 70% nitric acid and 35 ml of n-propanol was added from a dropping funnel into this solution over about 1 hour while stirring at 25%. This solution was allowed to stand at 25° C. for 20 days to obtain gel. The resulted gel was transferred into an autoclave, and a solvent in the gel was removed by extraction by flowing supercritical carbon dioxide of 45° C. and 24 MPa at a velocity of 8 g/min. for about 12 hours. Subsequently, the product was dried under reduced pressure at 25° C. and about 100 Pa for 10 hours to effect silylation treatment, obtaining about 12 g of a catalyst. The resulted catalyst had a surface area of 384 m$^2$/g and a pore volume of 1.4 ml/g.

The epoxidation reaction test was carried out under the following conditions. Into an autoclave was charged about 1 g of the above-mentioned catalyst, 17 g of propylene and 24 g of a 35% solution of ethylbenzene hydroperoxide in ethylbenzene, and they were reacted for 1.5 hours at 80' while stirring. The reaction solution was analyzed and the reaction result was determined. The results are shown in Table 1.

Example 2

The same operation as in Example 1 was conducted except that 21.6 g of 1,4-bis(trimethoxysilylethyl)benzene and 5.9 g of dimethoxydimethylsilane were used as silicon compounds and 21 ml of 70% nitric acid was used. The results are shown in Table 1.

Example 3

The same operation as in Example 1 was conducted except that 16.2 g of 1,2-bis(trimethoxysilyl)ethane and 6.2 g of dimethoxydimethylsilane were used as silicon compounds and 21 ml of 70% nitric acid was used. The results are shown in Table 1.

Example 4

The same operation as in Example 1 was conducted except that 28.0 g of 1,6-bis(trimethoxysilyl)hexane was used as a silicon compound and 5.7 ml of 70% nitric acid was further used. The results are shown in Table 1.

Comparative Example 1

The same operation as in Example 1 was conducted except that 26.1 g of tetramethoxysilane was used as a silicon compound and 30 ml of 70% nitric acid was used. The results are shown in Table 2.

Comparative Example 2

The same operation as in Example 1 was conducted except that 10.4 g of tetramethoxysilane and 14 g of tri-methoxymethylsilane were used as silicon compounds and 26 ml of 70% nitric acid was used. The results are shown in Table 2.

The results indicate the following matters. All examples satisfying the conditions of the present invention show satisfactory reaction results. On the other hand, Comparative Example 1 and Comparative Example 2 which did not use the silicon compound (1) of the present invention are poor in reaction results.

TABLE 1

|  | Example | | | |
|---|---|---|---|---|
|  | 1 | 2 | 3 | 4 |
| Ratio of R (%) | 50 | 95 | 95 | 50 |
| Reaction result |  |  |  |  |
| EBHP conversion (%) | 97.4 | 87.5 | 97.4 | 91.1 |
| PO/C3' yield (%) | 97.5 | 96.2 | 97.6 | 97.8 |

TABLE 2

|  | Comparative xample | |
|---|---|---|
|  | 1 | 2 |
| Ratio of R (%) | 0 | 60 |
| Reaction result |  |  |
| EBHP conversion (%) | 81.0 | 38.3 |
| PO/C3' yield (%) | 90.2 | 98.0 |

Explanation of Tables

Ratio of R (%): Ratio of the total molar amount of hydrocarbon groups R bonded to a Si atom to the total molar amount of Si.

EBHP conversion (%): [reacted EBHP (ethylbenzene hydroperoxide)/fed EBHP]×100(%).

PO/C3' yield (%): [produced PO (propylene oxide) (mol)/reacted propylene (mol)]×100 (%).

INDUSTRIAL APPLICABILITY

As described above, the present invention can provide a titanium-containing silicon oxide catalyst which can give an oxirane compound under high selectivity and yield by reacting an olefin and a hydroperoxide compound, and a process for producing an oxirane compound using the catalyst.

What is claimed is:

1. A process for producing a titanium-containing silicon oxide catalyst having a silicon-carbon-silicon bond, silicon-oxygen-silicon bond and silicon-oxygen-titanium bond, which comprises contacting a silicon compound of formula (1) and a titanium alkoxide compound in water and/or alcohol solvent and removing the solvent in the resulted gel by extraction with a supercritical fluid:

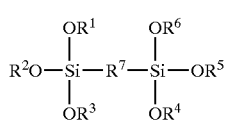

(1)

(wherein, $R^1$ to $R^7$ each independently represent a hydrocarbon group having 1 to 20 carbon atoms).

2. The process according to claim 1, further comprising a silicon compound of the following formula (2) and/or a silicon compound of the following formula (3)

$$Si(OR^8)_4 \quad (2)$$

$$(R^9)_m Si(OR^{10})_{4-m} \quad (3)$$

($R^8$, $R^9$ and $R^{10}$ each independently represent a hydrocarbon group having 1 to 20 carbon atoms. m represents an integer of 1 to 2. When a plurality of $R^8$'s, $R^9$'s or $R^{10}$'s are present in the silicon compound (2) and the silicon compound (3), they may be the same or different).

3. The process according to claim 2, wherein the ratio of the molar amount of hydrocarbon groups bonded to a silicon atom to the total silicon molar amount of the silicon compound (1) and silicon compound (2) and/or silicon compound (3) is from 5 to 150%.

4. A titanium-containing silicon oxide catalyst obtained by the process according to any of claims 1 to 3.

5. A process for producing an oxirane compound, comprising contacting an olefin with a hydroperoxide compound and the catalyst of claim 4.

* * * * *